(12) United States Patent
Jiang et al.

(10) Patent No.: US 10,291,087 B2
(45) Date of Patent: May 14, 2019

(54) ELECTRIC MOTOR

(71) Applicant: JOHNSON ELECTRIC INTERNATIONAL AG, Murten (CH)

(72) Inventors: Mao Xiong Jiang, Shenzhen (CN); Jian Zhao, Shenzhen (CN); Guo Wei Sun, Shenzhen (CN); Yong Li, Shenzhen (CN); Yong Wang, Shenzhen (CN); Hong Jiang Zhao, Shenzhen (CN); Yue Li, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 281 days.

(21) Appl. No.: 14/725,525

(22) Filed: May 29, 2015

(65) Prior Publication Data

US 2015/0349593 A1    Dec. 3, 2015

(30) Foreign Application Priority Data

May 29, 2014  (CN) .......................... 2014 1 0235916

(51) Int. Cl.
| | |
|---|---|
| *H02K 1/18* | (2006.01) |
| *H02K 3/34* | (2006.01) |
| *H02K 5/20* | (2006.01) |
| *H02K 21/22* | (2006.01) |
| *H02K 1/14* | (2006.01) |
| *H02K 1/27* | (2006.01) |
| *H02K 5/22* | (2006.01) |

(52) U.S. Cl.
CPC ............. *H02K 1/187* (2013.01); *H02K 1/146* (2013.01); *H02K 1/2786* (2013.01); *H02K 3/345* (2013.01); *H02K 5/20* (2013.01); *H02K 21/22* (2013.01); *H02K 5/225* (2013.01); *H02K 2213/03* (2013.01)

(58) Field of Classification Search
CPC .......... H02K 1/187; H02K 3/345; H02K 5/20; H02K 1/2786; H02K 1/146; H02K 21/22; H02K 2213/03; H02K 5/225
USPC ........................................ 310/156.53, 156.57
See application file for complete search history.

(56) References Cited

U.S. PATENT DOCUMENTS 4,801,832 A * 1/1989 Neumann ............ H02K 17/205
                                                310/184
5,825,108 A * 10/1998 De Filippis ............ H02K 21/22
                                                310/67 R
(Continued)

FOREIGN PATENT DOCUMENTS

JP         2006-304427 A      11/2006

*Primary Examiner* — Thomas Truong
*Assistant Examiner* — Leda T Pham
(74) *Attorney, Agent, or Firm* — Muncy, Geissler, Olds & Lowe, P.C.

(57) ABSTRACT

An electric motor has a wound stator and an outer rotor. A core of the stator has outer and inner annular portions. Tooth portions extend radially outwardly from the outer annular portion. Connecting arms interconnect the outer and inner annular portions. The width of the connecting arms is less than the width of the tooth portions. The ratio of tooth height L1 to distance between the roots of adjacent teeth L3 is in the range of 1.0 and 1.3. The ratio of tooth width T3 to L3 is in the range of 0.8 and 1.0. The ratio of tooth length T1 to L3 is in the range of 0.5 and 0.6. The ratio of T3 to outer diameter of the stator core D is in the range of 0.07 and 0.1.

16 Claims, 11 Drawing Sheets

(56) References Cited

U.S. PATENT DOCUMENTS

| | | | | |
|---|---|---|---|---|
| 6,700,287 B2* | 3/2004 | Ohmura | ............... | H02K 1/26 310/216.008 |
| 6,844,652 B1* | 1/2005 | Chu | ............... | H02K 1/276 310/156.53 |
| 7,656,063 B2* | 2/2010 | Tsukamoto | ............... | H02K 5/1732 303/116.4 |
| 8,110,957 B2* | 2/2012 | Murakami | ............... | H02K 1/278 310/156.38 |
| 2004/0160141 A1* | 8/2004 | Dube | ............... | H02K 1/148 310/216.028 |
| 2007/0257572 A1* | 11/2007 | Nakano | ............... | H02K 1/24 310/68 D |
| 2008/0224562 A1* | 9/2008 | Qin | ............... | H02K 1/265 310/216.004 |
| 2010/0277136 A1* | 11/2010 | Snitchler | ............... | H02K 1/165 322/59 |
| 2014/0368076 A1 | 12/2014 | Qin et al. | | |

* cited by examiner

| No. | Name of the Ratio | Minimum Ratio | Maximum Ratio | Preferred Value |
|---|---|---|---|---|
| 1 | L1/L3 | 1.0 | 1.3 | High Value |
| 2 | T3/L3 | 0.8 | 1.0 | Medium Value |
| 3 | T1/L3 | 0.5 | 0.6 | Medium Value |
| 4 | T3/D | 0.07 | 0.1 | High Value |

FIG. 10

| | T3 | T1 | L1 | L3 | L1/L3 | T3/L3 | T1/L3 |
|---|---|---|---|---|---|---|---|
| Unit | mm | mm | mm | mm | | | |
| Traditional Magnetic Conductive Core Lamination | 8 | 5.7 | 15.5 | 9.3 | 1.67 | 0.86 | 0.62 |
| Core Lamination of Present Invention | 9 | 6.2 | 12.8 | 10.3 | 1.25 | 0.88 | 0.6 |
| Scope of the Ratio | | | | | 1.0-1.3 | 0.8-1.0 | 0.5-0.6 |

FIG. 11

| | Length of the Stacked Lamination | Height of the Permanent magnet pole | Thickness of the Permanent Magnet Pole | Stator Windings | Rotor Speed | Current | Motor Efficiency | Average Motor Efficiency |
|---|---|---|---|---|---|---|---|---|
| Unit | mm | mm | mm | | rpm | A | | |
| Magnetic Core for Motor of Present Invention | 10 | 16 | 5 | Ø1.25×24.5 | 2030 | 18.79 | 82.51% | 82.11% |
| | 10 | 16 | 5 | Ø1.25×24.5 | 2016 | 18.63 | 82.60% | |
| | 10 | 16 | 5 | Ø1.25×24.5 | 2025 | 18.72 | 82.56% | |
| | 10 | 16 | 5 | Ø1.25×24.5 | 2004 | 18.71 | 81.80% | |
| | 10 | 16 | 5 | Ø1.25×24.5 | 2025 | 18.96 | 81.57% | |
| | 10 | 16 | 5 | Ø1.25×24.5 | 2017 | 18.88 | 81.59% | |
| Traditional Stator Core | 10 | 16 | 5 | Ø1.25×24.5 | 2041 | 19.84 | 78.63% | 78.76% |
| | 10 | 16 | 5 | Ø1.25×24.5 | 2023 | 19.58 | 78.89% | |
| Difference of average efficiency between the motor according to the present invention and traditional motor both of which have similar structure except different stator cores | | | | | | | | 3.35% |

FIG. 12

ELECTRIC MOTOR

CROSS REFERENCE TO RELATED APPLICATIONS

This non-provisional patent application claims priority under 35 U.S.C. § 119(a) from Patent Application No. 201410235916.5 filed in The People's Republic of China on May 29, 2014, the entire contents of which are hereby incorporated by reference.

FIELD OF THE INVENTION

This invention relates to an electric motor and in particular, to a brushless motor having an outer rotor.

BACKGROUND OF THE INVENTION

Electric motors have a stator and a rotor which is rotatable with respect to the stator. In an outer rotor motor the rotor is disposed around the stator. In a brushless DC motor the rotor has magnetic poles formed or created by one or more permanent magnets, while the stator has windings which form the magnetic poles of the stator. The stator core is a key component for mounting and positioning of the stator windings and providing magnetic flux path for the stator. The stator core is usually formed by a stack of core laminations of silicon steel.

Because the stator core has a magnetic resistance to the magnetic flux, during operation of the motor, the magnetic flux passing through the stator core generates heat. In addition, because the stator core itself is a conductor, during operation, an induction potential is generated in a plane perpendicular to the magnetic lines. This induction potential produces an eddy current in a transverse section of the stator core, such that the stator core generates heat thus resulting in an eddy current loss of the motor. The hysteresis loss and eddy current loss both occur in the stator core and are collectively referred to as iron loss of the motor. The use of laminations reduces the eddy current loss but they can still be significant.

As shown in FIG. 1, a core lamination 100 for forming the traditional stator core includes an annular portion 130, a plurality of tooth portions 150 extending radially outwardly from the annular portion 130, and a tip 170 disposed at a distal end of each tooth portion 150. Each tooth portion 150 is elongated with a large height, i.e. a large distance from a root (where the tooth portion 150 connects to the annular portion 130) of the tooth portion to the tip 170. This results in a long magnetic path and hence a high magnetic resistance. The magnetic flux passing through the stator core formed by the core laminations 100 generates a large amount of heat, thus causing a significant iron loss and hence a poor efficiency of the motor.

In order to enhance the motor efficiency, it is necessary to improve the stator core to reduce the iron losses. A typical method for reducing the iron loss is the use of low iron loss silicon steel. However, low iron loss silicon steel has a higher cost, which translates into an increased overall cost of the motor.

SUMMARY OF THE INVENTION

Hence, there is a desire for a motor with reduced iron losses and thus an enhanced efficiency.

Accordingly, in one aspect thereof, the present invention provides an electric motor comprising a stator and a rotor rotatable relative to the stator, the stator comprising a stator core, stator windings wound around the stator core, and a winding bracket for insulating the stator core from the stator windings, and the rotor comprising an outer housing and a plurality of permanent magnet poles fixed to an inner surface of the outer housing and surrounding an outer side of the stator core and stator windings, wherein the stator core comprises an outer annular portion, an inner annular portion, a plurality of tooth portions extending radially outwardly from the outer annular portion, a plurality of connecting arms interconnecting the outer annular portion and the inner annular portion, and a tip disposed at a distal end of each tooth portion, a width of the connecting arm in a circumferential direction of the motor is less than a width of the tooth portion in the circumferential direction.

Preferably, the winding bracket is formed over an outer surface of the stator core by an over-molding process.

Preferably, an outer surface of the outer annular portion comprises a plurality of planar surface sections, and side surfaces of the tooth portions are substantially perpendicular to the corresponding planar surface section.

Preferably, an end wall of the outer housing of the rotor defines a plurality of ventilation openings, ventilation slots are defined between adjacent ones of the connecting arms of the stator core, and the ventilation slots are in flow communication with the ventilation openings.

Preferably, a tooth width of each tooth portion is defined as T3, a height of each tooth portion is defined as L1, a circumferential distance between roots of adjacent tooth portions is defined as L3, the ratio of L1 to L3 is in the range of 1.0 to 1.3, and the ratio of T3 to L3 is in the range of 0.8 to 1.0.

Preferably, a radial width of the outer annular portion is defined as T1, and the ratio of T1 to L3 is in the range of 0.5 to 0.6.

Preferably, an outer diameter of the stator core is defined as D, and the ratio of T3 to D is in the range of 0.07 to 0.1.

Preferably, an outer surface of the permanent magnet pole is an outer arc surface with a convex middle, an inner surface of the permanent magnet pole is a curved surface with a concave middle, the curved surface comprises an arc surface section and two planar surface sections, the arc surface section is connected between the two planar surface sections to form the whole curved surface, the permanent magnet pole has a pole arc coefficient in the range of 0.7 to 0.96, and the ratio of an arc angle β of the arc surface section to the pole arc angle α of the permanent pole is in the range of 0.15 to 0.35.

Preferably, an angle θ formed between a radial line of an arc surface section passing through the point of connection of the arc surface section and a corresponding planar surface sections and the planar surface section is in the range of 85 to 95 degrees.

Preferably, the ratio of a maximum value to a minimum value of a gap between each of the permanent magnet poles and a corresponding tip of the stator core is in the range of 3 to 7.

Preferably, the radial width T1 of the outer annular portion is 6.2 mm, the tooth width T3 of each tooth portion is 9 mm, the height L1 of each tooth portion is 12.8 mm, and the circumferential distance L3 between the roots of adjacent tooth portions is 10.3 mm.

According to a second aspect, the present invention provides a magnetic core for an electric motor, the magnetic core formed by a stack of core laminations, wherein each of the core laminations comprises an outer annular portion, an inner annular portion, a plurality of tooth portions extending radially outwardly from the outer annular portion, a plurality of connecting arms interconnecting the outer annular portion and the inner annular portion, and a tip disposed at a distal end of each tooth portion, a width of the connecting arm in a circumferential direction of the motor is less than a width of the tooth portion in the circumferential direction, a radial width of the outer annular portion is defined as T1, a tooth width of each of the tooth portions is defined as T3, a height of each of the tooth portions is defined as L1, a circumferential distance between roots of each two adjacent tooth portions is defined as L3, the ratio of L1 to L3 is in the range of 1.0 to 1.3, the ratio of T3 to L3 is in the range of 0.8 to 1.0, and the ratio of T1 to L3 is in the range of 0.5 to 0.6.

Preferably, an outer diameter of the core lamination is defined as D, and the ratio of T3 to D is in the range of 0.07 to 0.1.

Preferably, an outer surface of the outer annular portion comprises a plurality of planar surface sections, and side surfaces of the tooth portions are substantially perpendicular to the outer surface of the outer annular portion.

Preferably, the radial width T1 of the outer annular portion is 6.2 mm, the tooth width T3 of each tooth portion is 9 mm, the height L1 of each tooth portion is 12.8 mm, and the circumferential distance L3 between the roots of adjacent tooth portions is 10.3 mm.

In the motor of the present invention, the motor efficiency is increased by modifying the structure of the stator core to include the inner annular portion, the connecting arms, the outer annular portion, the tooth portions and tips. In the magnetic core, the height of the tooth portions is shortened, such that the magnetic path is shortened and hence the magnetic resistance is reduced. In particular, the ratio of the tooth height L1 of the core laminations of the magnetic core to the circumferential distance L3 between the roots of each two adjacent tooth portions is set to be 1.0-1.3, the ratio of the tooth width T3 of each tooth portion and the circumferential distance L3 between the roots of each two adjacent tooth portions is set to be 0.8-1.0, the ratio of the radial with T1 of the annular portion to the circumferential distance L3 between the roots of each two adjacent tooth portions is set to be 0.5-0.6, the ratio of tooth width of each tooth portion to the outer diameter D of the core lamination is set to be 0.07-0.1, which effectively reduces the magnetic resistance of the stator core and, as a result, reduces the iron loss of the motor and increases the motor efficiency.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 10 shows the size ratio values relating to the core lamination of the stator core of the present invention;

FIG. 11 is a chart showing the comparison of the size ratio values relating to the core lamination of the stator core of the present invention and the known core lamination;

FIG. 12 is a chart showing the comparison of the efficiency of the motor employing the stator core according to the present invention and the motor employing the known stator core;

DETAILED DESCRIPTION OF THE PREFERRED EMBODIMENTS

Figure 1:
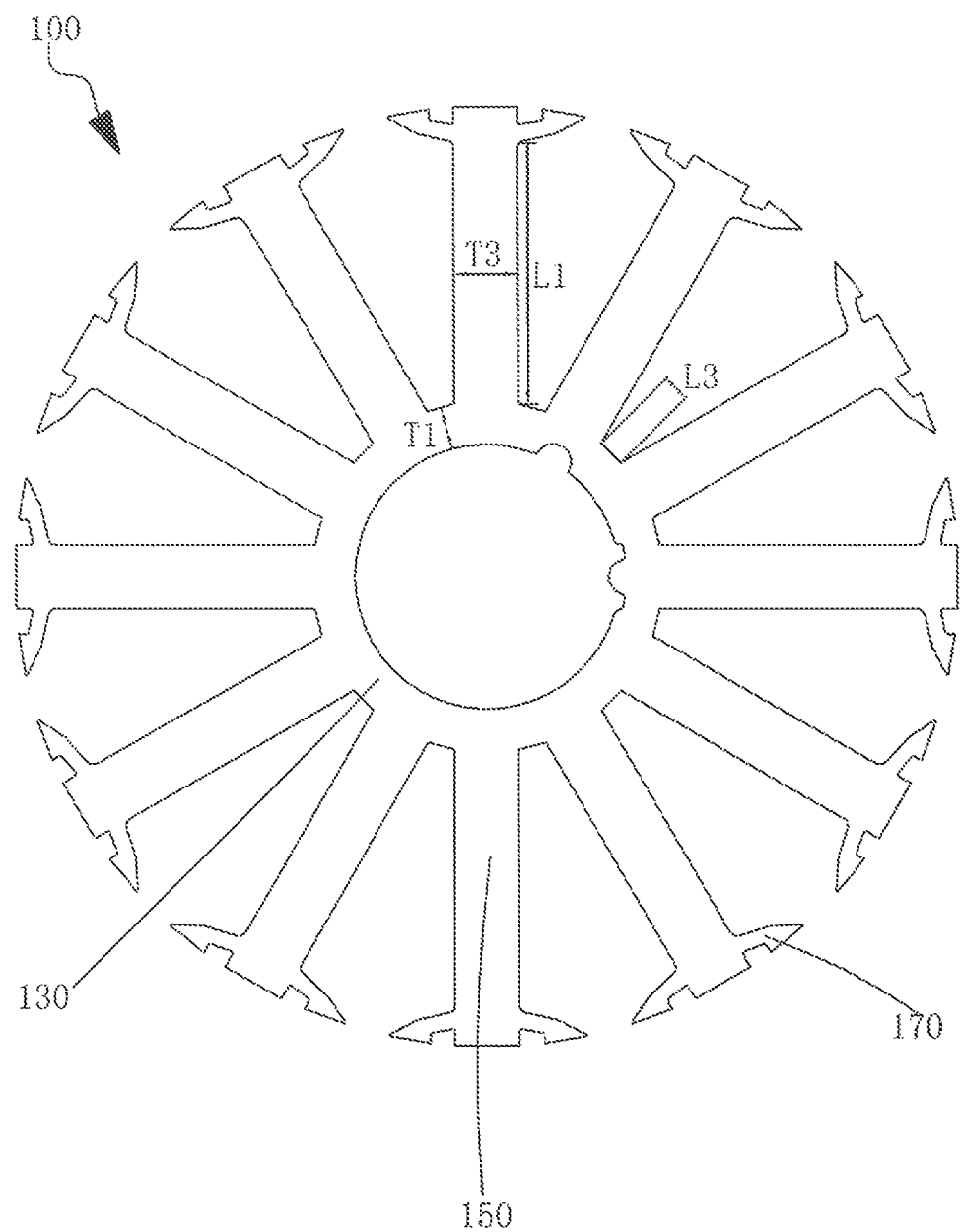
FIG. 1 illustrates a core lamination of a known stator core.
Figure 2:
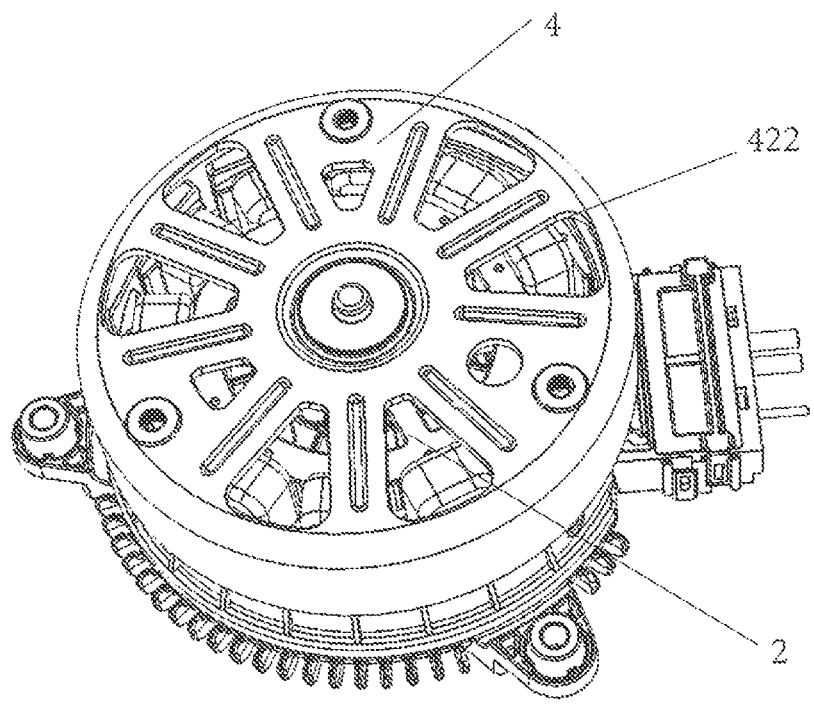
FIG. 2 is a perspective view of a motor according to one embodiment of the present invention.
Figure 3:
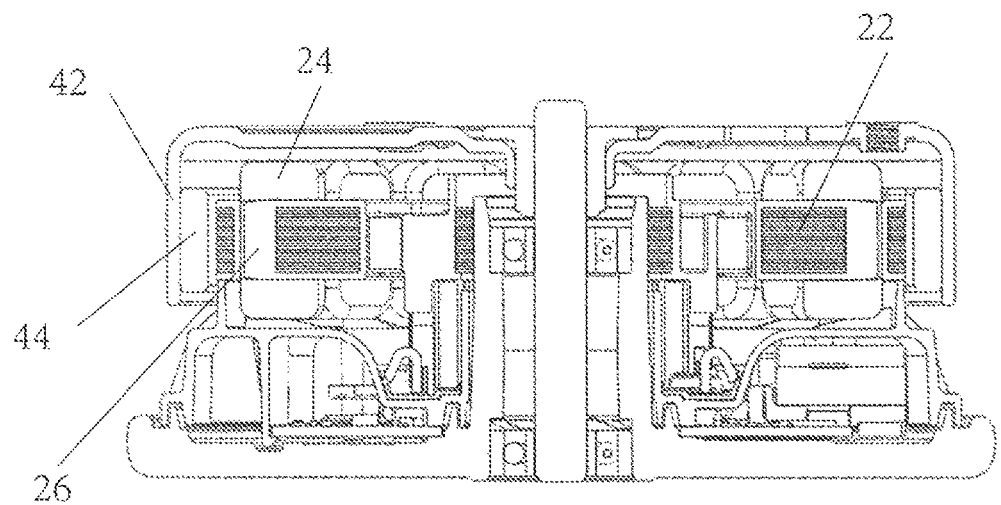
FIG. 3 is a longitudinal sectional view of the motor of FIG. 2.
Figure 4:
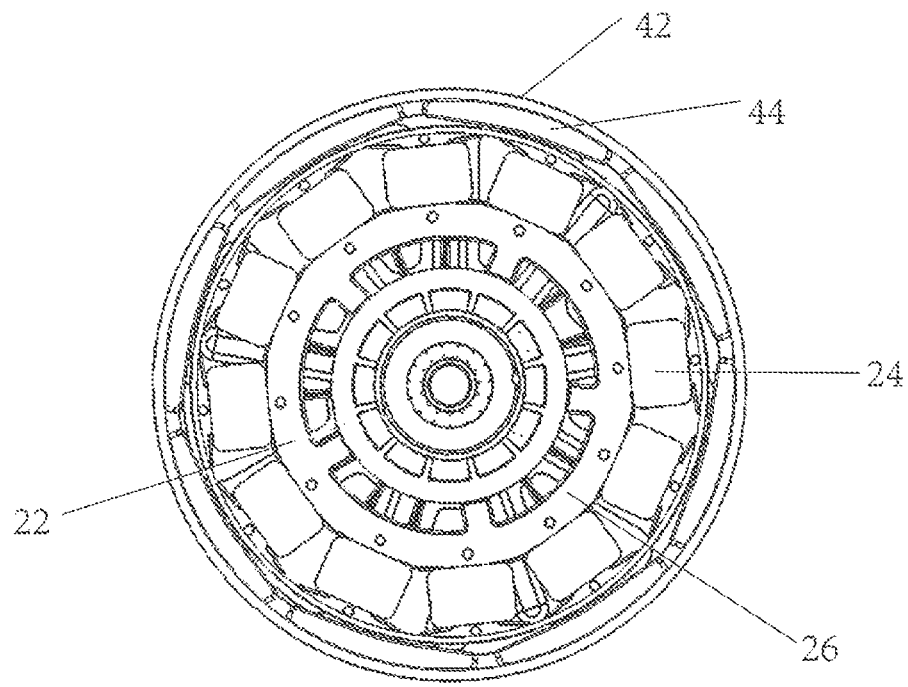
FIG. 4 is a cross-sectional view of the motor of FIG. 2.

Referring to FIG. 2 through FIG. 4, a motor in accordance with the preferred embodiment of the present invention is shown. The motor includes a stator 2 and a rotor 4 rotatable relative to the stator 2. The rotor 4 includes an outer housing 42 and a plurality of permanent magnet poles 44 fixed to an inner surface of the outer housing 42. The stator 2 includes a stator core 22, stator windings 24 wound around the stator core 22, and an insulating winding bracket 26 for insulating the stator core 22 from the stator windings 24. The permanent magnet poles 44 surround an outer side of the stator core 22 and stator windings 24.

Figure 5:
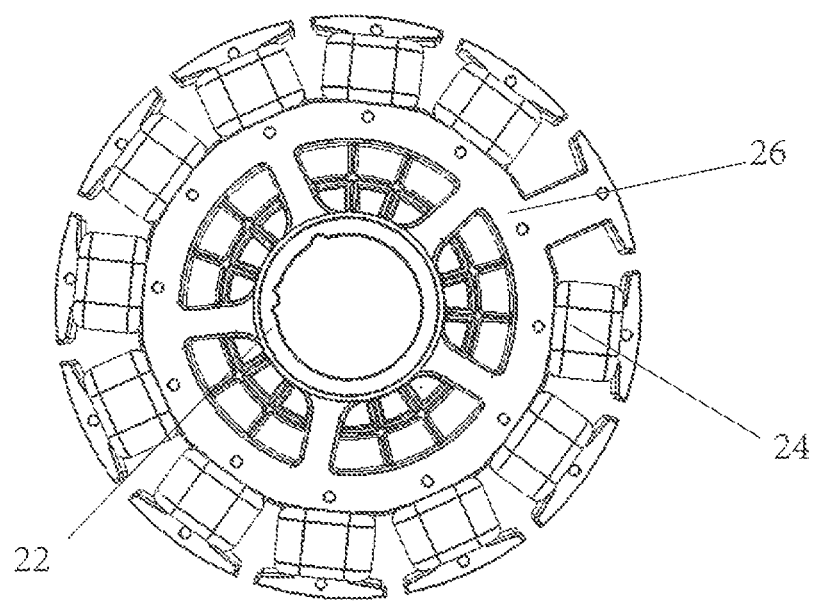
FIG. 5 illustrates a stator of the motor of FIG. 2.
Figure 6:
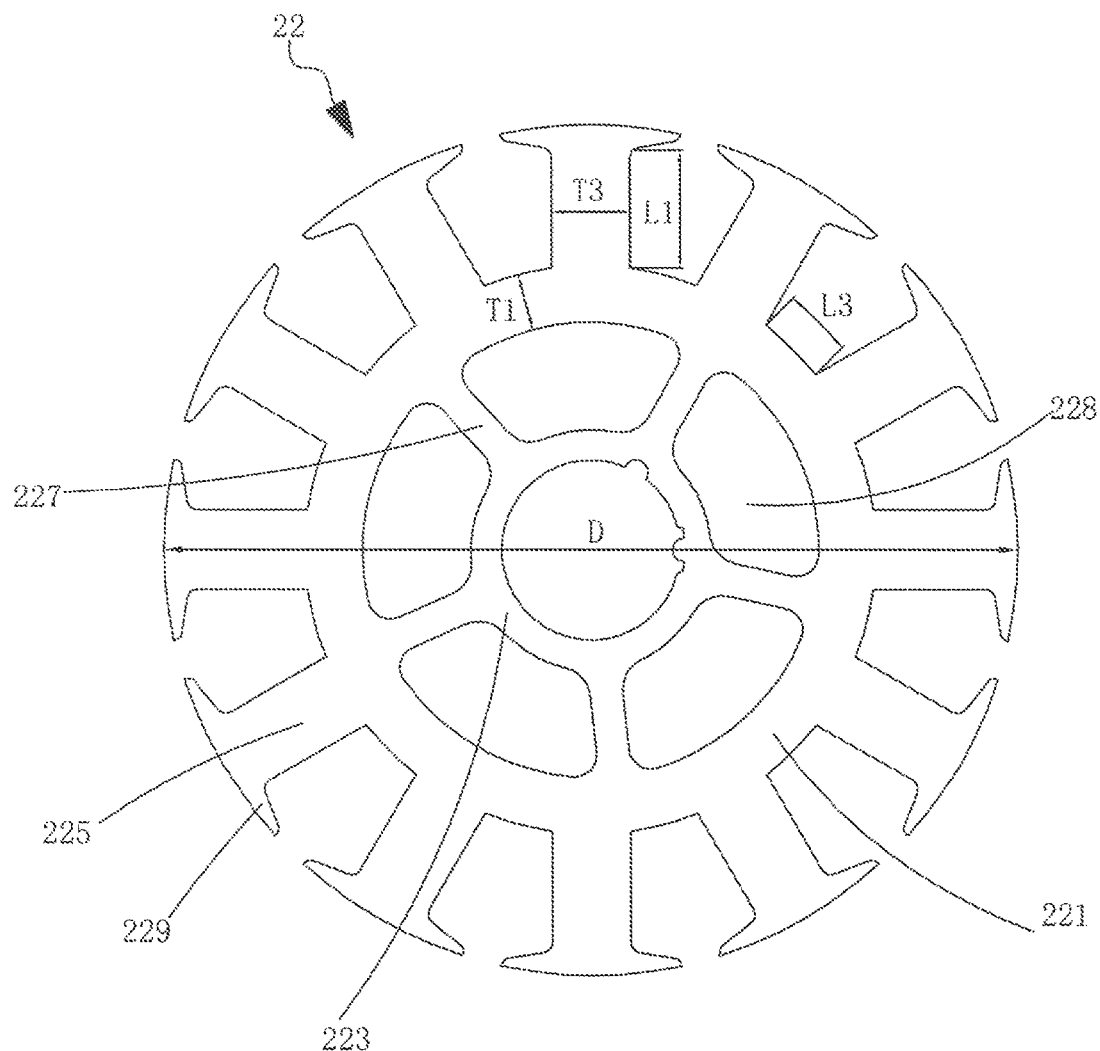
FIG. 6 illustrates the stator core according to one embodiment.
Figure 7:
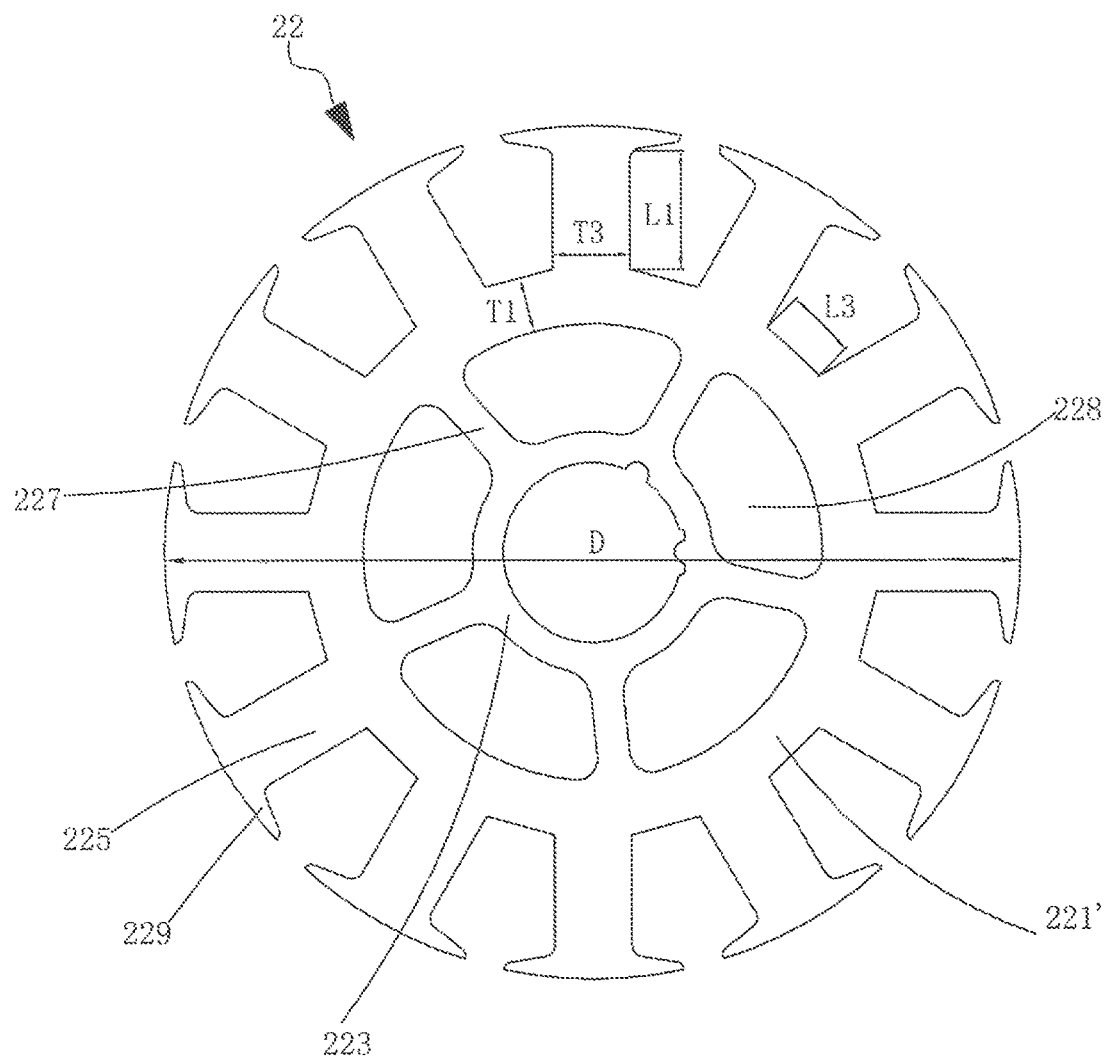
FIG. 7 illustrates the stator core according to another embodiment.

Referring also to FIG. 5 through FIG. 7, the stator core of the motor of the present invention has an improved construction. The stator core 22 includes an outer annular portion or ring 221, an inner annular portion or ring 223, a plurality of tooth portions 225 extending radially outwardly from the outer annular portion 221, a plurality of connecting arms 227 connecting the outer annular portion 221 and the inner annular portion 223, and a tip 229 disposed at a distal end of each tooth portion 225. A width of the connecting arm 227 in a circumferential direction of the motor is less than a width of the tooth portion 225 in the circumferential direction, and each tip 229 extends in the circumferential direction of the motor at the distal end of the corresponding tooth portion 225.

The winding bracket 26 is formed over an outer surface of the stator core 22 by an over-molding process, but exposes surfaces of the tooth tips 229 of the stator core 22 that confront the permanent magnet poles 44 of the rotor 4. In FIG. 5 one coil of the stator winding has been omitted to show the underlying tooth portion covered by the winding bracket.

An end wall of the outer housing 42 of the rotor defines a plurality of ventilation openings 422. Ventilation slots 228 are defined between adjacent connecting arms 227 of the stator core 22, which are in flow communication with the ventilation openings 422. This arrangement facilitates heat dissipation from an interior of the motor.

Referring to FIG. 6, in one embodiment of the present invention, an outer surface of the outer annular portion 221 of the stator core 22 includes a plurality of arc surface sections concentric with the inner annular portion 223. The tooth portions 225 extend radially outwardly from the outer surface of the outer annular portion 221.

Referring to FIG. 7, in another embodiment, an outer surface of an outer annular portion 221' of the stator core 22 includes a plurality of planar surface sections. Side surfaces of the tooth portions 225 are substantially perpendicular to the outer surface of the outer annular portion 221', and the angle between the side surfaces of the tooth portions 225 and the outer surface of the outer annular portion 221' may be in the range of 85 to 100 degrees.

The stator core 22 has an outer diameter D, the outer annular portion 221 has a radial width T1, each tooth portion 225 has a tooth width T3, each tooth portion 225 has a height L1, i.e. the distance L1 from a tooth root (where the tooth portion 225 connects to the outer annular portion 221) to the tip 229, and the roots of adjacent tooth portions 225 have a circumferential separation distance L3 there between. The ratio of L1 to L3 is in the range of 1.0 to 1.3. The ratio of T3 to L3 is in the range of 0.8 to 1.0. The ratio of T1 to L3 is in the range of 0.5 to 0.6. The ratio of T3 to D is in the range of 0.07 to 0.1.

The present invention further provides a magnetic core for a motor. The magnetic core may be used as a stator core.

Figure 8:
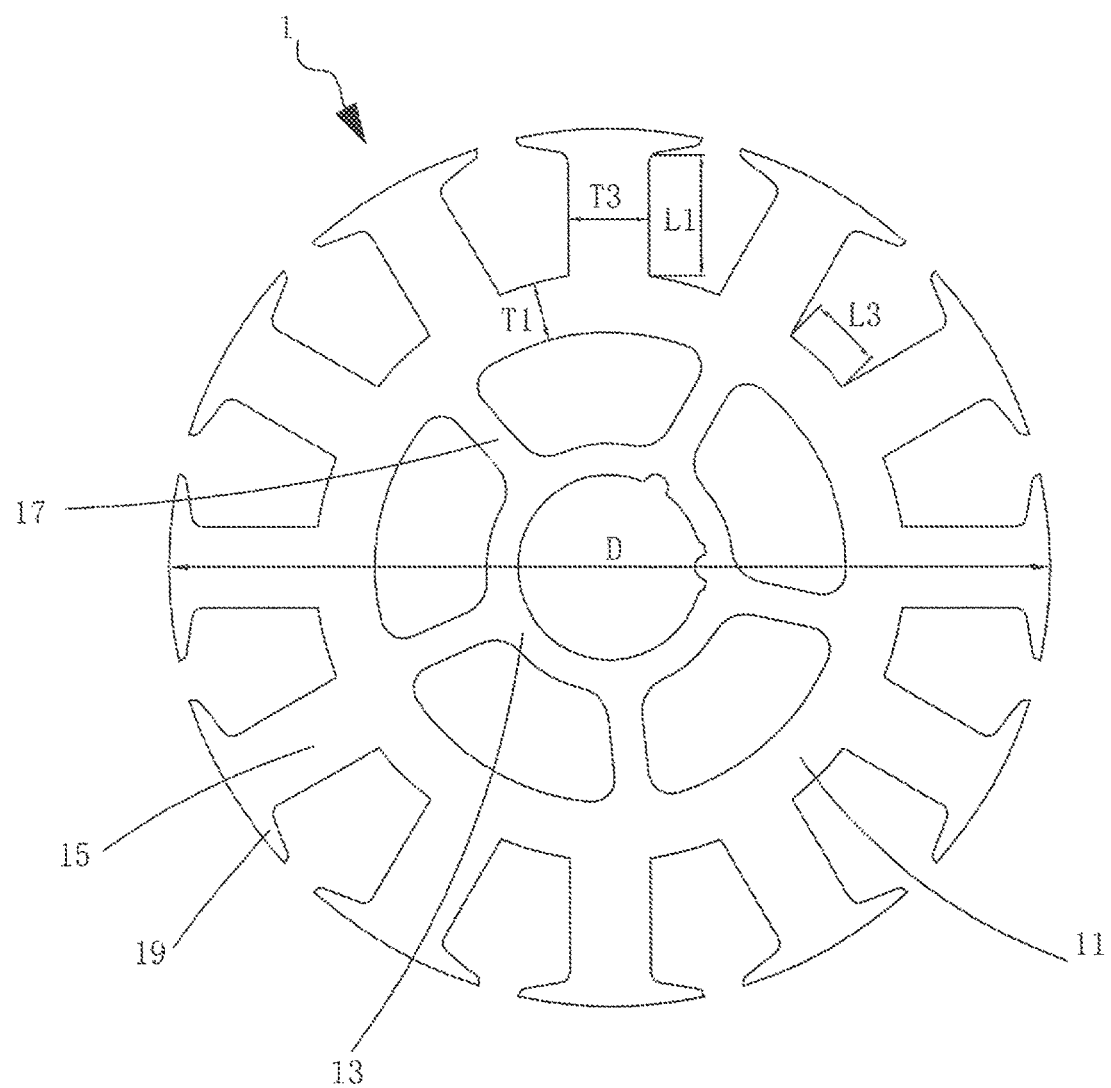
FIG. 8 illustrates a core lamination of a magnetic core for a motor according to one embodiment.

The magnetic core of the present invention is formed by a stack of core laminations. FIG. 8 illustrates the core lamination 1 according to one embodiment. The core lamination 1 includes an outer annular portion 11, an inner annular portion 13, a plurality of tooth portions 15 extending radially outwardly from the outer annular portion 11, a plurality of connecting arms 17 connecting the outer annular portion 11 and the inner annular portion 13, and a tip 19 disposed at a distal end of each tooth portion 15. A with of the connecting arm 17 in a circumferential direction of the core lamination 1 is less than a width of the tooth portion 15 in the circumferential direction, and each tip 19 extends in the circumferential direction of the core lamination 1 at the distal end of the corresponding tooth portion 15.

Referring also to FIG. 10, the core lamination 1 has an outer diameter D, the outer annular portion 11 has a radial width T1, each tooth portion 15 has a tooth width T3, each tooth portion 15 has a height L1, i.e. the distance L1 from a tooth root (where the tooth portion 15 connects to the outer annular portion 11) to the tip 19, and the roots of each two adjacent tooth portions 15 have a circumferential distance L3 there between. The ratio of L1 to L3 is in the range of 1.0 to 1.3, and a higher ratio is preferable. The ratio of T3 to L3 is in the range of 0.8 to 1.0, and a medium-sized ratio is preferable. The ratio of T1 to L3 is in the range of 0.5 to 0.6, and a medium-sized ratio is preferable. The ratio of T3 to D is in the range of 0.07 to 0.1, and a higher ratio is preferable.

In this embodiment, the outer surface of the outer annular portion 11 includes a plurality of arc surface sections concentric with the inner annular portion 13. The tooth portions 15 extend radially outwardly from the outer surface of the outer annular portion 11.

Figure 9:
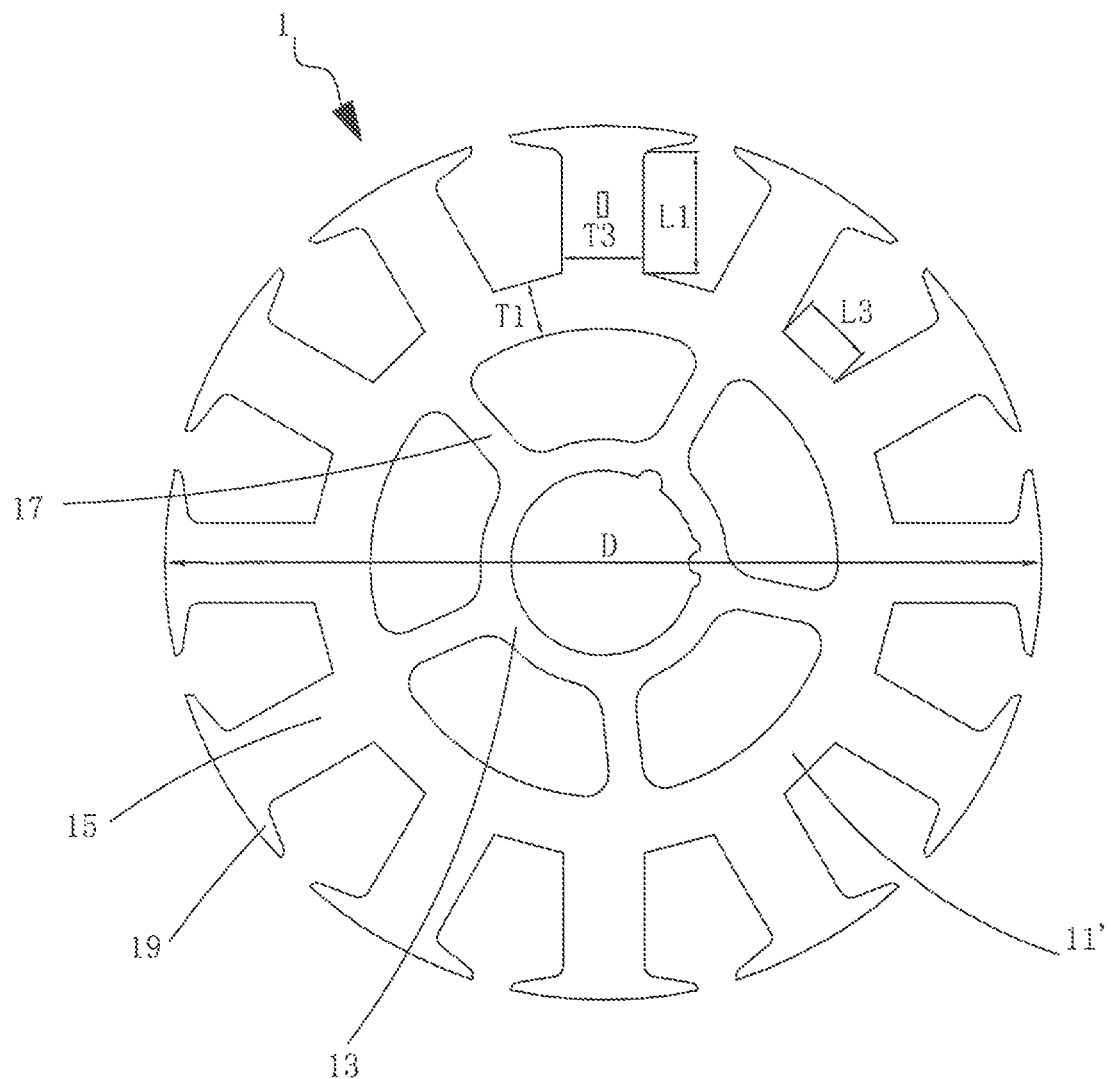
FIG. 9 illustrates a core lamination of a magnetic core for a motor according to another embodiment.

FIG. 9 illustrates a core lamination 1 for a motor according to another embodiment. The core lamination 1 of this embodiment differs from the above embodiment is that the outer surface of an outer annular portion 11' includes a plurality of planar surface sections. Side surfaces of the tooth portions 15 are substantially perpendicular to the outer surface of the outer annular portion 11', and the angle between the side surfaces of the tooth portions 15 and the outer surface of the outer annular portion 11' may be in the range of 85 to 100 degrees.

Referring to FIG. 11, in a motor that employs the magnetic core of the present invention as a stator core, the radial width T1 of the outer annular portion 11 of the core lamination 1 is 6.2 mm, the tooth width T3 of each tooth portion 15 is 9 mm, the height L1 of each tooth portion 15 is 12.8 mm, and the circumferential distance L3 between the roots of adjacent tooth portions 15 is 10.3 mm. The ratio of L1 to L3 is 1.25, the ratio of T3 to L3 is 0.88, and the ratio of T1 to L3 is 0.6.

In a similar motor that employs the known stator core, the radial width T1 of an annular portion 130 of a core lamination 100 is 5.7 mm, the tooth width T3 of each tooth portion 150 is 8 mm, the height L1 of each tooth portion 150 is 15.5 mm, and the circumferential distance L3 between the roots of each two adjacent tooth portions 150 is 9.3 mm. The ratio of L1 to L3 is 1.67, which exceeds the range of 1.0-1.3 of the present invention; the ratio of T3 to L3 is 0.86; and the ratio of T1 to L3 is 0.62, which exceeds the range of 0.5-0.6 of the present invention. In comparison with the known core lamination 100, the core lamination 1 of the present invention is achieved by increasing the tooth width T3 of the tooth portion 15, the radial width T1 of the outer annular portion 11, and the circumferential distance L3 between the roots of adjacent tooth portions 15, and decreasing the height L1 of the tooth portion 15. The new core lamination 1 with optimized magnetic circuit shortens the magnetic path in comparison with the known core lamination 100, thereby reducing the magnetic resistance and iron loss of the motor and hence enhancing the efficiency of the motor.

Referring to FIG. 12, as verified by experiments, for motors having the same rotor, same stator winding's wire diameter and turns, the motor having the magnetic core of the present invention has an average efficiency of 82.11%, while the motor having the known magnetic core has an average efficiency of 78.76%. Therefore, the use of the magnetic core of the present invention improves the efficiency of the motor by 3.35%.

The core lamination 1 may be formed by stamping a silicon steel sheet or a nickel-iron soft magnetic alloy sheet with good magnetically conductive capability. Alternatively, the core lamination may be formed by other magnetically conductive materials.

In summary, in the motor of the present invention, the motor efficiency is increased by modifying the structure of the stator core to include the inner annular portion, the connecting arms, the outer annular portion, the tooth portions and tips. In the magnetic core, the height of the tooth portions is shortened, such that the magnetic path is shortened and hence the magnetic resistance is reduced. In particular, the ratio of the tooth height L1 of the core laminations of the magnetic core to the circumferential distance L3 between the roots of adjacent tooth portions is in the range of 1.0 to 1.3, the ratio of the tooth width T3 of each tooth portion and the circumferential distance L3 between the roots of each two adjacent tooth portions is in the range of 0.8 to 1.0, the ratio of the radial width T1 of the annular portion to the circumferential distance L3 between the roots of adjacent tooth portions is in the range of 0.5 to 0.6, the ratio of tooth width of each tooth portion to the outer diameter D of the core lamination is in the range of 0.07 to 0.1, which effectively reduces the magnetic resistance of the stator core and, as a result, reduces the iron loss of the motor and increases the motor efficiency.

It should be understood that the magnetic core for a motor of the present invention can also be used in a wound rotor.

Figure 13:
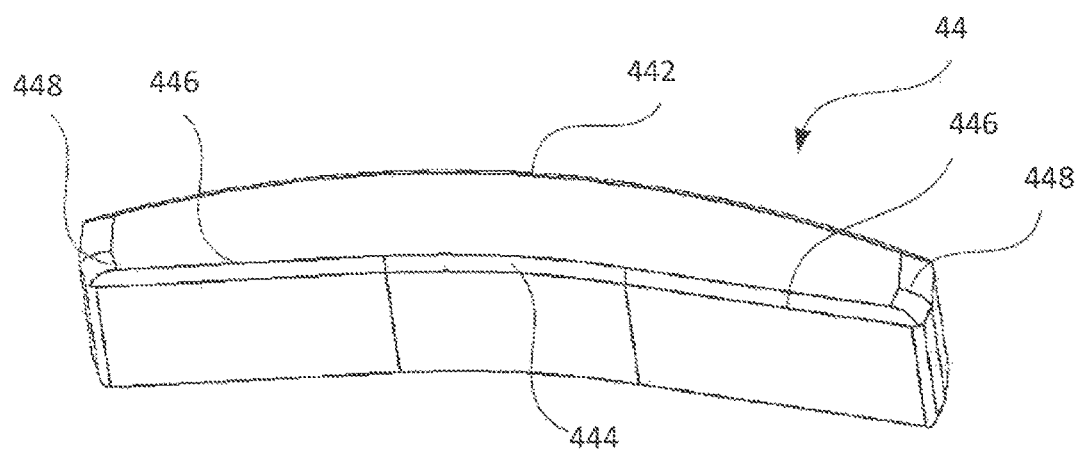
FIG. 13 is a perspective view of a permanent magnet pole of the rotor according to one embodiment.
Figure 14:
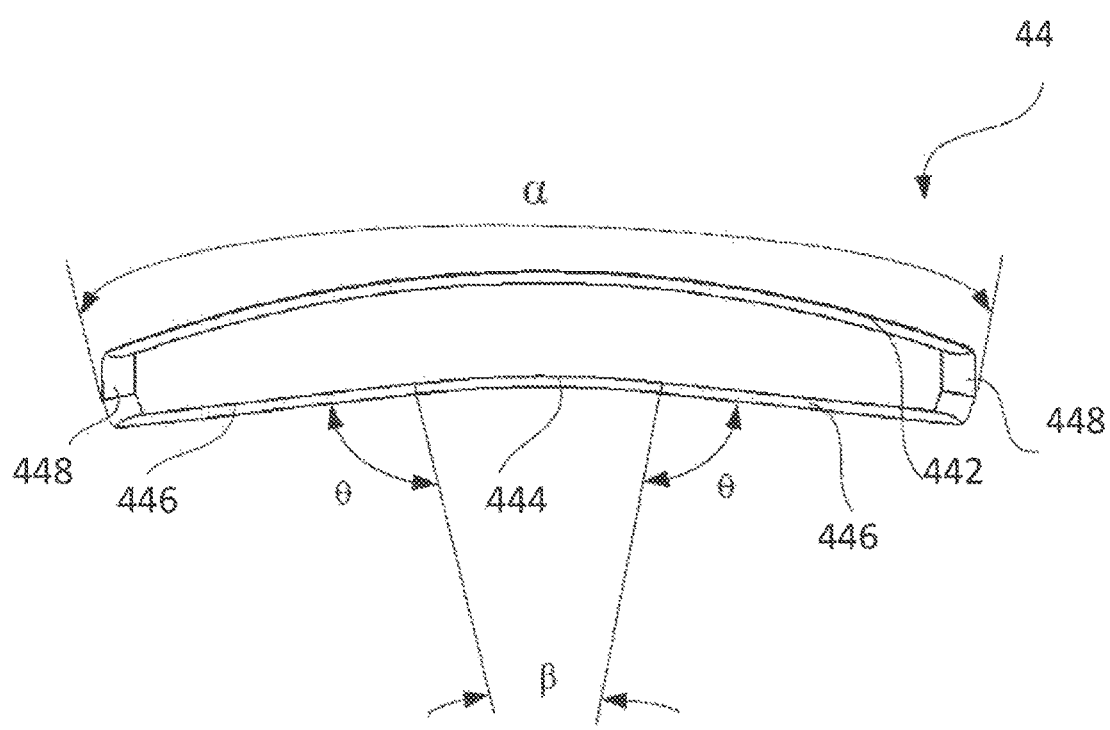
FIG. 14 is a top view of the permanent magnet pole of FIG. 13.
Figure 15:
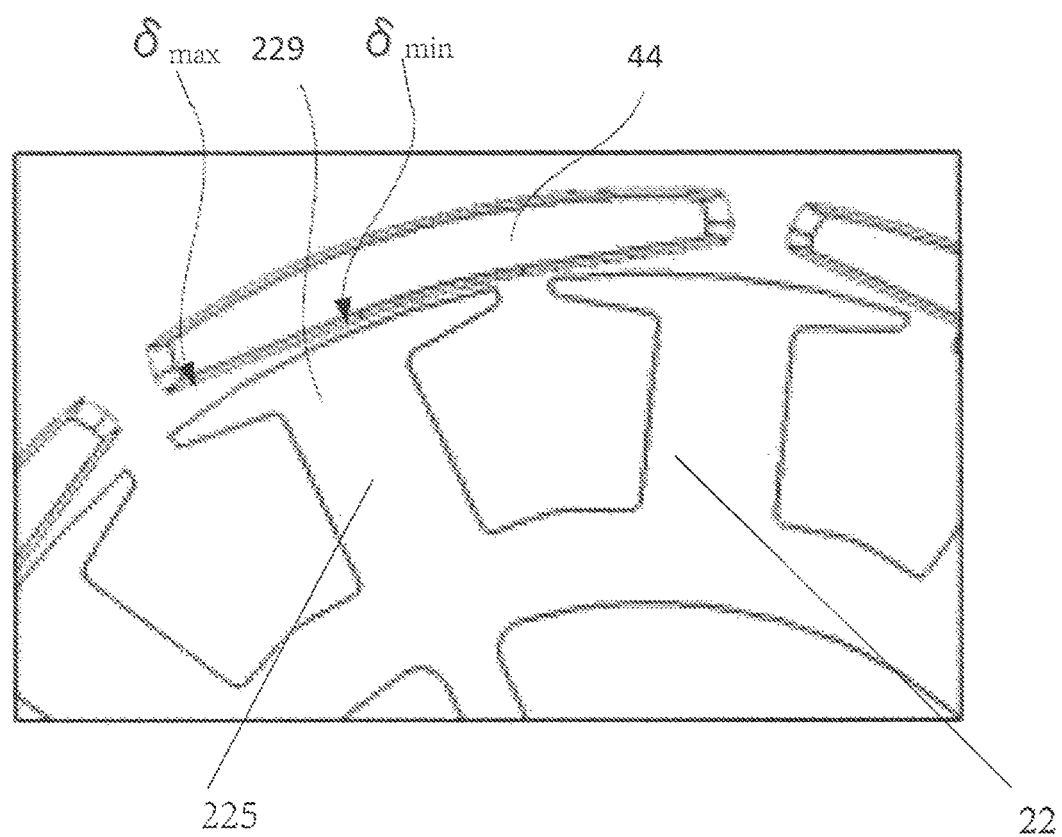
FIG. 15 is an enlarged, partially top view of the permanent magnet pole and stator core of the motor.

Referring to FIG. 13 through FIG. 15, the permanent magnet pole 44 of the present invention may also be optimized. Specifically, the magnet pole 44 has an arc outer surface 442 with a convex middle. The permanent magnet pole 44 has a curved inner surface with a concave middle, which includes an arc surface section 444 and two planar surface sections 446. The arc surface section 444 is connected between the two planar surface sections 446 to form the whole curved surface. The permanent magnet pole has a pole arc coefficient of 0.7-0.96, and the ratio of an arc angle β of the arc surface section 444 to the pole arc angle α of the permanent magnet pole is in the range of 0.15 to 0.35.

Specifically, the arc of the inner surface (i.e. the arc surface section 444) of the permanent magnet pole 44 and the arc of the outer surface (i.e. the arc outer surface 442) of the permanent magnet pole 44 are concentric. Each planar surface section 446 is at an angle θ in the range of 85 to 95 degrees to a radius of one corresponding arc surface section 444 at an end thereof that connects to the planar surface section 446. In addition, the outer surface 442 and the inner surface of the permanent magnet pole 44 are interconnected by an arc transition surface 448 at each of two opposite ends of the permanent magnet pole 44. More specifically, the permanent magnet pole 44 has a thickness gradually decreasing from the middle towards the opposite ends.

An air gap is formed between the inner surface of each permanent magnet pole 44 and an outer surface of the tip 229 of a corresponding tooth portion 225 of the stator core. The ratio of a maximum value of the air gap δmax to a minimum value of the air gap δmin is in the range of 3 to 7, preferably, 5. As such, the air gaps formed between the permanent magnet poles 44 and their corresponding tooth portions 225 of the stator core 22 are uneven, thus reducing the cogging torque and hence the noise during motor operation.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric motor comprising:
a stator; and
a rotor rotatable relative to the stator,
wherein the stator comprises a stator core, stator windings wound around the stator core, and a winding bracket for insulating the stator core from the stator windings,
wherein the rotor comprises an outer housing and a plurality of permanent magnet poles fixed to an inner surface of the outer housing and surrounding an outer side of the stator core and stator windings,
wherein the stator core comprises an outer annular portion, an inner annular portion, a plurality of tooth portions extending radially outwardly from the outer annular portion, a plurality of connecting arms interconnecting the outer annular portion and the inner annular portion, and a tip disposed at a distal end of each tooth portion, each of the connecting arms starts outwardly from the inner annular portion and ends at the outer annular portion, a width of the connecting arm in a circumferential direction of the motor is less than a width of the tooth portion in the circumferential direction, ventilation slots are defined between adjacent ones of the connecting arms, the ventilation slots and the connecting arms disposed alternately in the circumferential direction, and
wherein the width of each tooth portion is defined as T3, a height of each tooth portion is defined as L1, a circumferential distance between roots of adjacent tooth portions is defined as L3, the ratio of L1 to L3 is in the range of 1.0 to 1.3, and the ratio of T3 to L3 is in the range of 0.8 to 1.0.

2. The motor of claim 1, wherein the winding bracket is formed over an outer surface of the stator core by an over-molding process.

3. The motor of claim 1, wherein an outer surface of the outer annular portion comprises a plurality of planar surface sections, and side surfaces of the tooth portions are substantially perpendicular to the corresponding planar surface section.

4. The motor of claim 1, wherein an end wall of the outer housing of the rotor defines a plurality of ventilation openings, and the ventilation slots are in flow communication with the ventilation openings.

5. The motor of claim 1, wherein a radial width of the outer annular portion is defined as T1, and the ratio of T1 to L3 is in the range of 0.5 to 0.6.

6. The motor of claim 1, wherein an outer diameter of the stator core is defined as D, and the ratio of T3 to D is in the range of 0.07 to 0.1.

7. The motor of claim 1, wherein an outer surface of the permanent magnet pole is an outer arc surface with a convex middle, an inner surface of the permanent magnet pole is a curved surface with a concave middle, the curved surface comprises an arc surface section and two planar surface sections, the arc surface section is connected between the two planar surface sections to form the whole curved surface, the permanent magnet pole has a pole arc coefficient in the range of 0.7 to 0.96, and the ratio of an arc angle β of the arc surface section to the pole arc angle α of the permanent magnet pole is in the range of 0.15 to 0.35.

8. The motor of claim 7, wherein an angle θ formed between each of the planar surface sections and a corresponding radius at an end of one arc surface section that connects to the planar surface sections is in the range of 85 to 95 degrees.

9. The motor of claim 7, wherein the ratio of a maximum value to a minimum value of a gap between each of the permanent magnet poles and a corresponding tip of the stator core is in the range of 3 to 7.

10. The motor of claim 1, wherein the radial width T1 of the outer annular portion is 6.2 mm, the tooth width T3 of each tooth portion is 9 mm, the height L1 of each tooth portion is 12.8 mm, and the circumferential distance L3 between the roots of adjacent tooth portions is 10.3 mm.

11. The motor of claim 1, wherein the number of the ventilation slots is equal to that of the connecting arms.

12. A magnetic core for a motor, the magnetic core formed by a stack of core laminations, wherein each of the core laminations comprises an outer annular portion, an inner annular portion, a plurality of tooth portions extending radially outwardly from the outer annular portion, a plurality of connecting arms interconnecting the outer annular portion and the inner annular portion, and a tip disposed at a distal end of each tooth portion, each of the connecting arms starts outwardly from the inner annular portion and ends at the outer annular portion, a width of each connecting arm in a circumferential direction of the motor is less than a width of each tooth portion in the circumferential direction, a radial width of the outer annular portion is defined as T1, a width of each tooth portion is defined as T3, a height of each tooth portion is defined as L1, a circumferential distance between roots of adjacent tooth portion is defined as L3, the ratio of L1 to L3 is in the range of 1.0 to 1.3, the ratio of T3 to L3 is in the range of 0.8 to 1.0, and the ratio of T1 to L3 is in the range of 0.5 to 0.6.

13. The magnetic core of claim 12, wherein an outer diameter of the core lamination is defined as D, and the ratio of T3 to D is in the range of 0.07 to 0.1.

14. The magnetic core of claim 12, wherein an outer surface of the outer annular portion comprises a plurality of planar surface sections, and side surfaces of the tooth portions are substantially perpendicular to the outer surface of the outer annular portion.

15. The magnetic core of claim 12, wherein the radial width T1 of the outer annular portion is 6.2 mm, the tooth width T3 of each tooth portion is 9 mm, the height L1 of each tooth portion is 12.8 mm, and the circumferential distance L3 between the roots of adjacent tooth portions is 10.3 mm.

16. An electric motor comprising:
a stator; and
a rotor rotatable relative to the stator,
wherein the stator comprises a stator core, stator windings wound around the stator core, and a winding bracket for insulating the stator core from the stator windings,
wherein the rotor comprises an outer housing and a plurality of permanent magnet poles fixed to an inner surface of the outer housing and surrounding an outer side of the stator core and stator windings, and
wherein the stator core comprises an outer annular portion, an inner annular portion, a plurality of tooth portions extending radially outwardly from the outer annular portion, a plurality of connecting arms interconnecting the outer annular portion and the inner annular portion, and a tip disposed at a distal end of each tooth portion, wherein a width of each tooth portion is defined as T3, a height of each tooth portion is defined as L1, a circumferential distance between roots of adjacent tooth portions is defined as L3, the ratio of L1 to L3 is in the range of 1.0 to 1.3, and the ratio of T3 to L3 is in the range of 0.8 to 1.0.

* * * * *